(12) United States Patent
Tucker

(10) Patent No.: US 7,513,422 B1  
(45) Date of Patent: Apr. 7, 2009

(54) TRANSACTION CARD WITH EXTENDED MAGNETIC STRIP

(75) Inventor: Ron Tucker, Norman, OK (US)

(73) Assignee: Stonehouse Marketing Services, Inc., Norman, OK (US)

( * ) Notice: Subject to any disclaimer, the term of this patent is extended or adjusted under 35 U.S.C. 154(b) by 296 days.

(21) Appl. No.: 11/010,968

(22) Filed: Dec. 13, 2004

(51) Int. Cl.
*G06K 5/00* (2006.01)

(52) U.S. Cl. .................................. 235/380; 235/449

(58) Field of Classification Search ............. 235/380, 235/449, 487; 283/57, 61, 62
See application file for complete search history.

(56) References Cited

U.S. PATENT DOCUMENTS

| | | | |
|---|---|---|---|
| 2,616,612 A | * | 11/1952 | Guttman ................ 229/92.8 |
| 5,495,981 A | * | 3/1996 | Warther .................... 229/71 |
| 5,842,629 A | * | 12/1998 | Sprague et al. ............. 229/71 |
| 6,328,341 B2 | * | 12/2001 | Klure ........................ 283/62 |
| 6,471,127 B2 | * | 10/2002 | Pentz et al. ................ 235/487 |
| 6,543,809 B1 | * | 4/2003 | Kistner et al. .............. 283/57 |
| 6,588,658 B1 | * | 7/2003 | Blank ........................ 235/380 |
| 6,623,039 B2 | * | 9/2003 | Thompson et al. .......... 283/61 |
| 6,688,529 B1 | * | 2/2004 | Goade, Sr. .................. 235/488 |
| 6,793,141 B1 | * | 9/2004 | Graham ..................... 235/487 |
| 6,877,666 B2 | * | 4/2005 | Goade, Sr. .................. 235/488 |
| 6,898,880 B2 | * | 5/2005 | Best et al. ............... 40/299.01 |
| 7,083,086 B2 | * | 8/2006 | Whitaker ................... 235/380 |
| 7,093,767 B2 | * | 8/2006 | Faenza et al. .............. 235/493 |
| 7,204,652 B2 | * | 4/2007 | Warther ...................... 400/76 |

* cited by examiner

*Primary Examiner*—Ahshik Kim
(74) *Attorney, Agent, or Firm*—Crowe & Dunlevy, P.C.

(57) ABSTRACT

Disclosed is a transaction card assembly that includes a transaction card and a carrier. The transaction card includes four sides, of which two are connected to the carrier. A magnetic stripe extends across the transaction card and a portion of the carrier. The transaction card and carrier collectively form a substantially rectangular-shaped transaction card assembly.

9 Claims, 2 Drawing Sheets

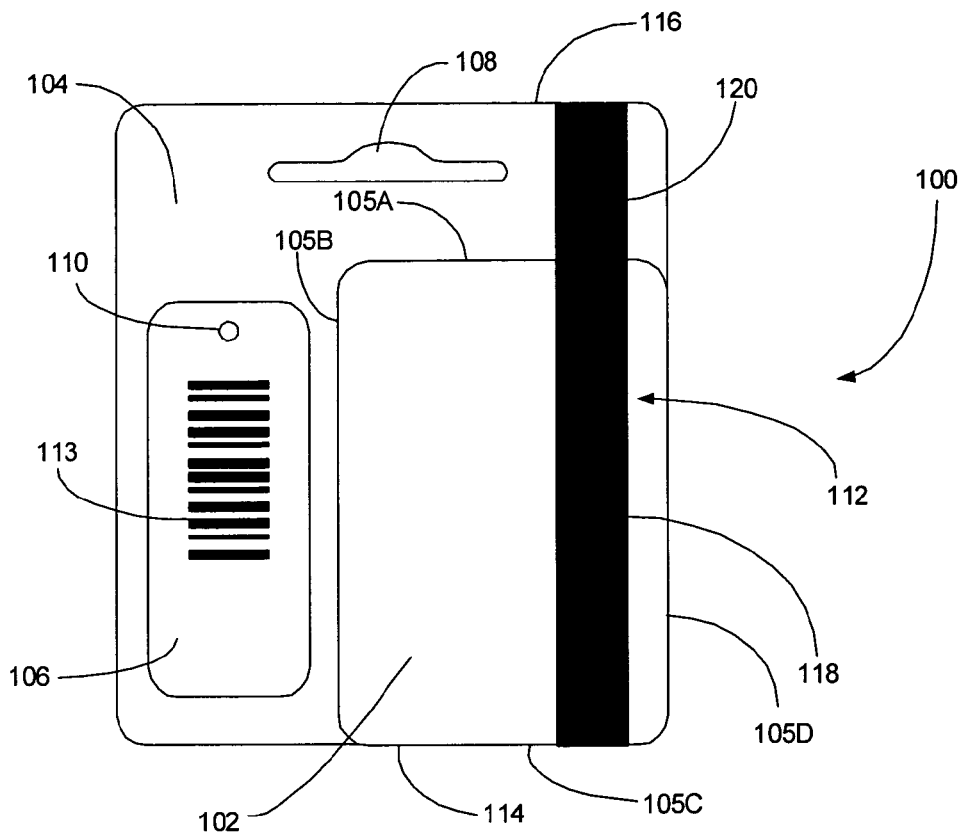
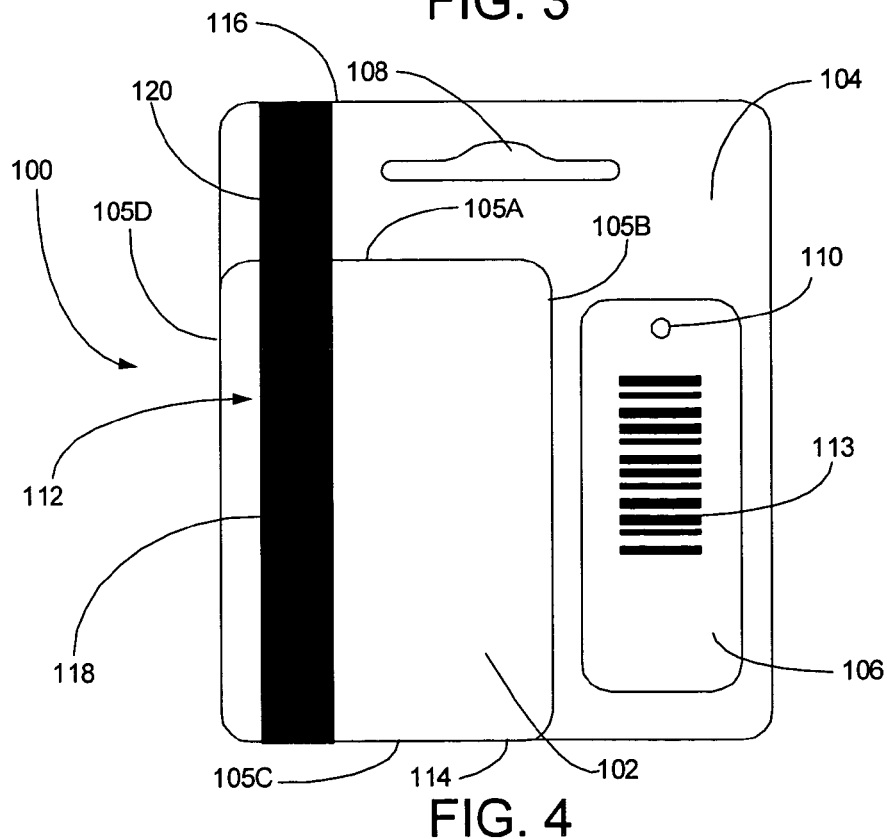

TRANSACTION CARD WITH EXTENDED MAGNETIC STRIP

FIELD OF THE INVENTION

This invention relates generally to the field of transaction cards.

BACKGROUND

Transaction cards are an efficient means for storing and providing information between a consumer and a participating vendor or issuing agent. For example, transaction cards are commonly used in customer loyalty and gift card programs, as prepaid phone cards or as credit and debit cards. Transaction cards are often offered by a manufacturer as part of package that also includes an attached carrier and additional cards or key tags. In many cases, the carrier includes advertisements and holes for hanging the transaction card at a sale display.

Information is typically encoded on the cards in a machine readable format, such as a bar code or on a magnetic stripe. The information stored on the transaction card may be static and fixed during manufacture, as in a bar code, or in a variable format that permits modification of the information during use, as in a magnetic stripe. Bar codes are fixed during manufacture to provide specified data over the life of the card. In contrast, magnetic stripes are capable of being encoded and re-encoded with variable information.

Modern equipment used to encode the magnetic stripe is highly automated and operates at a high volume. Typically, the transaction card with the magnetic stripe is passed through the encoding equipment in a specified direction and speed. As the transaction card passes through the encoder, an encoding "head" encodes information to the magnetic stripe.

In the past, card manufacturers have configured transaction card assemblies so that the portion of the card with the magnetic stripe extends below the carrier. Such a prior art design is taught in U.S. Pat. No. 5,921,584 issued to Goade, Sr. on Jul. 13, 1999 (the "Goade '584 patent"). A representation of one of the embodiments disclosed by the Goade '584 patent is presented in the prior art drawing of FIG. 1. FIG. 1 shows a transaction card assembly 200 that includes a card carrier 202 and a transaction card 204. The transaction card 204 includes a magnetic stripe 206 that resides on a portion of the card 204 that extends below the carrier 202. In this way, the magnetic stripe 206 can be accessed by an encoding machine without obstruction from the card carrier 202.

This configuration was necessary at the time to allow encoding. However, this configuration weakens the construction of the card assembly and is somewhat unattractive. As shown by the prior art card assembly in FIG. 2, manufacturers have recently strengthened the transaction card assembly card by increasing the amount of contact between the card and carrier. The prior art transaction card assembly 300 of FIG. 2 includes a carrier 302 and a card 304 with a magnetic stripe 306. Unlike the card assembly in the Goade '584 patent, however, three full sides of the card 304 are attached to the carrier 302. This modification greatly improves the structural integrity of the card assembly 300. Because the magnetic stripe 306 is typically applied as an integral part of a laminate over the card assembly 300, the magnetic stripe 306 extends across the entire card assembly 300, crossing the card 304 and the attached sides of the carrier 302.

Although structurally superior, the prior art card assembly 300 shown in FIG. 2 presents some difficulty during the encoding process. Because only the portion of the magnetic stripe 306 adhered to the card 304 is used to retain information, the encoding equipment must not prematurely begin the transfer of information on the portions of the magnetic stripe 306 adhered to the carrier 302. To ensure that encoder properly places the data on the card 304, a complex "delayed encoding" process must be followed in which the encoder detects and edge of the card assembly 100 and calculates a delay period based on the distance between the edge of the carrier and the edge of the card.

This process requires precise calculations and advanced encoding equipment. A need therefore exists for a transaction card and carrier design that exhibits increased structural integrity while eliminating the need for advanced encoding equipment. It is to these and other needs that the present invention is directed.

SUMMARY OF THE INVENTION

In a preferred embodiment, the present invention provides a transaction card assembly that includes a transaction card and a carrier. The transaction card includes four sides, of which two are connected to the carrier. A magnetic stripe extends across the transaction card and a portion of the carrier. The transaction card and carrier collectively form a substantially rectangular-shaped transaction card assembly.

BRIEF DESCRIPTION OF THE DRAWINGS

FIG. 3 is a top plan view of a transaction card assembly constructed in accordance with a preferred embodiment of the present invention.

FIG. 4 is a top plan view of a transaction card assembly constructed in accordance with an alternate embodiment of the present invention.

DETAILED DESCRIPTION OF THE PREFERRED EMBODIMENT

Figure 1:
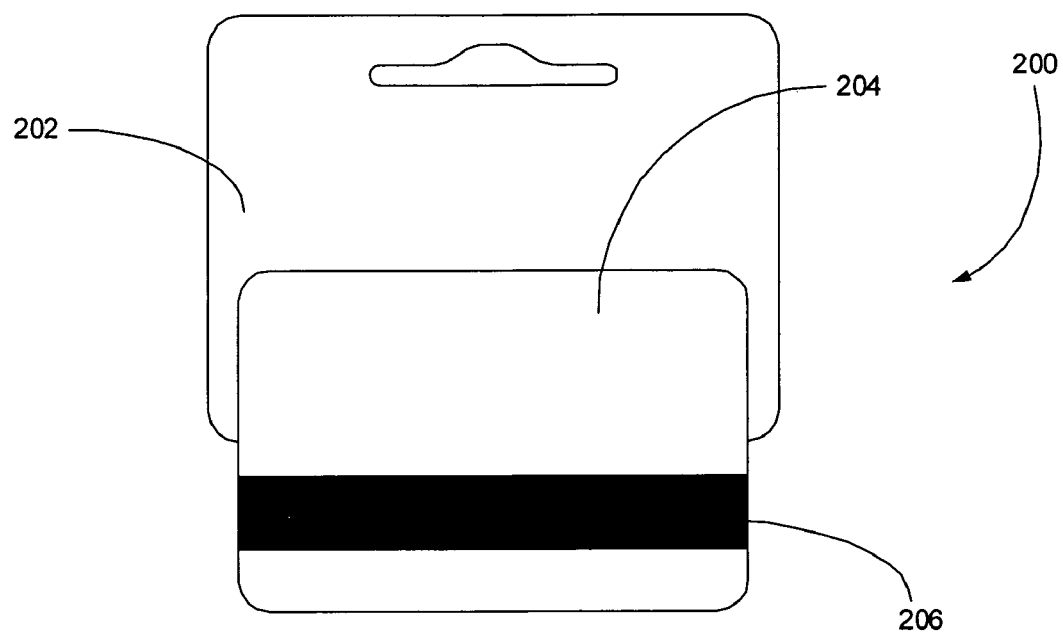
FIG. 1 is a top plan view of a prior art transaction card assembly.
Figure 2:
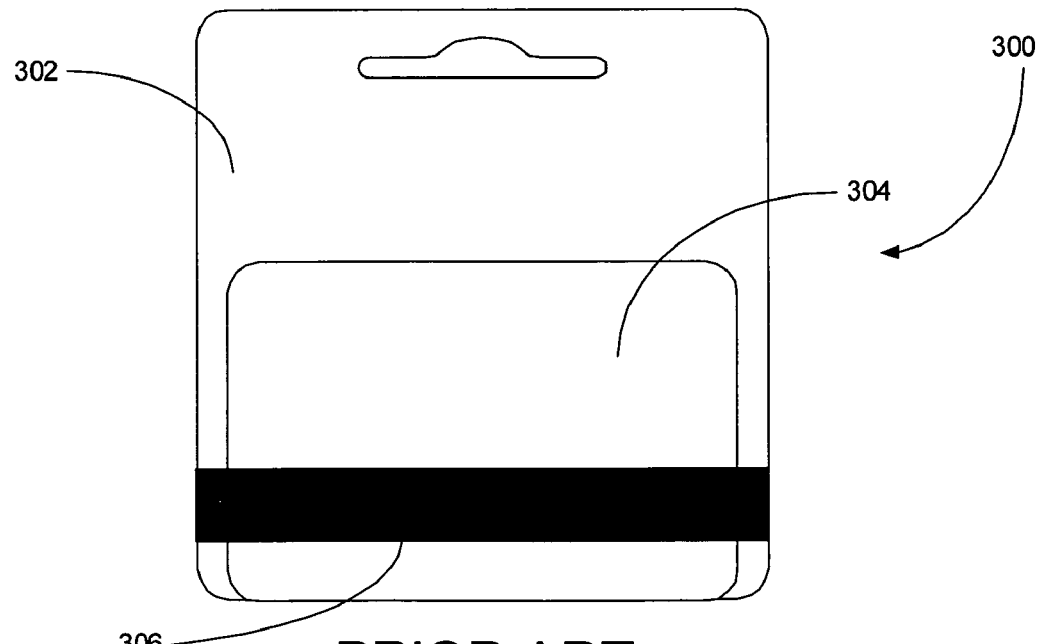
FIG. 2 is a top plan view of a prior art transaction card assembly.

FIG. 3 shows a top plan view of a transaction card assembly 100 constructed in accordance with a preferred embodiment of the present invention. The transaction card assembly 100 includes a transaction card 102, a carrier 104, and a key tag 106. The carrier 104 preferably includes a display hole 108 that can be used to hang the card assembly 100 from a hook or other point of purchase display. The key tag 106 is also shown to include a key ring hole 110 for attaching the key tag 106 to a key ring or the like. Although the transaction card assembly 100 is shown having a single transaction card 102 and a single key tag 106, it will be understood that additional or alternative cards can be included within the transaction card assembly 100. For example, in an alternate preferred embodiment, the transaction card assembly 100 includes two transaction cards 102 and two key tags 106. The transaction card 102 and the key tag 106 preferably also include informational indicia that correspond to a user or an account. The informational indicia are preferably presented in a machine-readable format, such as magnetic stripes and bar codes.

The transaction card assembly 100 is preferably constructed from a thin, laminated substrate. Suitable substrates include TESLIN, which is commercially available from PPG Industries. The substrate is preferably available in sheets that can be easily and efficiently laser printed with desired indicia. The transaction card 102 and the key tag 106 are preferably detachable from the carrier 104 for independent use. In the preferred embodiment, a press is used to die-cut the transaction card assembly 100 to create a perforated connection between the transaction card 102, key tag 106 and the carrier 104.

The transaction card 102 and carrier 104 are preferably configured such that only sides 105a and 105b of the transaction card 102 are attached to the carrier 104. Accordingly, sides 105c and 105d are not attached to the carrier 104. In this configuration, the transaction card 102 is connected on two full sides 105a, 105b to the carrier 104 but does not extend beyond the carrier 104. Thus, the transaction card 102 and carrier 104 collectively create a substantially rectangular-shaped transaction card assembly 100.

In the presently preferred embodiment, the transaction card 102 includes a magnetic stripe 112 and the key tag 106 includes a bar code 113. It will be understood, however, that the transaction card 102 and key tag 106 can also include additional or alternative forms of informational indicia. As shown in FIG. 3, the magnetic stripe 112 extends across the entire length of the transaction card assembly 100 from a leading edge 114 to a trailing edge 116, across the entire transaction card 102 and a portion of the carrier 104. For the purposes of this disclosure, the portion of the magnetic stripe 112 on the transaction card 104 will be referred to as the "card portion" 118 and the portion of the magnetic stripe 112 on the carrier 104 will be referred to as the "carrier portion" 120.

During the encoding process, the magnetic stripe 112 can be encoded by moving the transaction card assembly 100 through an encoder with the leading edge 114 first (i.e., right to left facing the magnetic stripe 112) such that the magnetic stripe 112 passes in close proximity to an encoding head. In this way, the magnetic stripe 112 can be accessed by encoding equipment from the leading edge 114 without interference or obstruction from the carrier 104. This configuration of the card carrier 104 and card 102 obviates the need for sophisticated and potentially error-prone delayed encoding techniques. As the leading edge 114 passes into the encoder, information can be immediately encoded onto the card portion 118 of the magnetic stripe 112.

In some cases, the encoder may be designed to process the transaction card assembly 100 in the opposite direction (i.e, left to right facing the magnetic stripe 112). To avoid the need for delayed encoding, a mirror image of the transaction card assembly 100, as shown in FIG. 4, can be used. Thus, using the configurations shown in FIGS. 3 and 4, the transaction card assembly 100 can be encoded without using delay techniques in almost any encoder.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A transaction card assembly, comprising:
   a carrier;
   a transaction card having four sides, wherein two complete sides are not connected to the carrier; and
   a magnetic stripe extending across the transaction card and a portion of the carrier.

2. The transaction card assembly of claim 1, wherein the carrier is attached to the transaction card along a perforated connection.

3. The transaction card assembly of claim 1, wherein the transaction card assembly further comprises a key tag attached to the carrier.

4. The transaction card assembly of claim 1, wherein the transaction card and card carrier collectively form a substantially rectangular shape.

5. The transaction card assembly of claim 1, wherein the carrier includes a display hole.

6. A substantially rectangular-shaped transaction card assembly having a leading edge and a trailing edge, the transaction card assembly further comprising:
   a carrier;
   a substantially rectangular-shaped transaction card adjacent the leading edge, wherein the transaction card has two complete sides that are not connected to the carrier and two complete sides that are connected to the carrier; and
   a magnetic stripe extending from the leading edge to the trailing edge across the transaction card and a portion of the carrier.

7. The transaction card assembly of claim 6, wherein the magnetic stripe is encoded by passing the transaction card assembly through an encoder with the leading edge first.

8. The transaction card assembly of claim 6, wherein the transaction card is connected to the carrier with a perforated connection.

9. A substantially rectangular-shaped transaction card assembly comprising:
   a carrier;
   a substantially rectangular-shaped transaction card connected to the carrier, wherein the transaction card has two complete sides that are not connected to the carrier; and
   a magnetic stripe extending across the transaction card and a portion of the carrier, wherein the magnetic stripe can be encoded without using delayed encoding techniques.

* * * * *